(12) United States Patent
Holzmann et al.

(10) Patent No.: US 7,614,390 B2
(45) Date of Patent: Nov. 10, 2009

(54) TWO STAGE DRAINAGE GAS-LIQUID SEPARATOR

(75) Inventors: Mark V. Holzmann, Stoughton, WI (US); Christopher E. Holm, Madison, WI (US); Brian W. Schwandt, Fort Atkinson, WI (US)

(73) Assignee: Cummins Filtration IP Inc., Minneapolis, MN (US)

( * ) Notice: Subject to any disclaimer, the term of this patent is extended or adjusted under 35 U.S.C. 154(b) by 77 days.

(21) Appl. No.: 11/843,705

(22) Filed: Aug. 23, 2007

(65) Prior Publication Data

US 2009/0050121 A1 Feb. 26, 2009

(51) Int. Cl.
*B01D 45/08* (2006.01)
(52) U.S. Cl. .................................... 123/572
(58) Field of Classification Search ......... 123/572–574, 123/41, 86, 41.86; 55/309, 329
See application file for complete search history.

(56) References Cited

U.S. PATENT DOCUMENTS

| | | | |
|---|---|---|---|
| 1,548,288 A | 8/1925 | Smtih | |
| 1,761,944 A | 6/1930 | Smith | |
| 2,493,617 A | 1/1950 | Chubbuck | |
| 3,201,925 A | 8/1965 | Shada | |
| 3,433,231 A | 3/1969 | Siragusa | |
| 3,923,480 A | 12/1975 | Visch | |
| 4,012,209 A | 3/1977 | McDowell et al. | |
| 4,014,673 A | 3/1977 | Kinnison | |
| 4,401,093 A | 8/1983 | Gates, Jr. et al. | |
| 4,993,517 A | 2/1991 | Leipelt et al. | |
| 5,129,371 A | 7/1992 | Rosalik, Jr. | |
| 5,201,301 A | 4/1993 | Re | |
| 5,205,848 A | 4/1993 | Blanc et al. | |
| 5,329,913 A | 7/1994 | Suzuki et al. | |
| 5,460,147 A | 10/1995 | Bohl | |
| 5,562,087 A | 10/1996 | Wright | |
| 5,564,401 A | 10/1996 | Dickson | |
| 6,073,618 A | 6/2000 | Sanders et al. | |
| 6,074,448 A | 6/2000 | Schulz et al. | |
| 6,152,120 A * | 11/2000 | Julazadeh | 123/572 |
| 6,247,463 B1 | 6/2001 | Fedorowicz et al. | |
| 6,279,556 B1 | 8/2001 | Busen et al. | |

(Continued)

FOREIGN PATENT DOCUMENTS

CH 127029 5/1927

(Continued)

OTHER PUBLICATIONS

Highly Efficient Oil Separation Systems for Minimised Oil Carry Over, MTZ Apr. 2008, vol. 69, pp. 32-37.

*Primary Examiner*—M. McMahon
(74) *Attorney, Agent, or Firm*—Andrus, Sceales, Starke & Sawall, LLP; J. Bruce Schelkopf

(57) ABSTRACT

A two stage drainage gas-liquid separator assembly includes an inertial gas-liquid impactor separator having one or more nozzles accelerating a gas-liquid stream therethrough, and an inertial impactor in the path of the accelerated gas-liquid stream and causing liquid particle separation from the gas-liquid stream, and further includes a coalescer filter downstream of the inertial gas-liquid impactor separator and effecting further liquid particle separation, and coalescing separated liquid particles.

13 Claims, 7 Drawing Sheets

U.S. PATENT DOCUMENTS

| | | |
|---|---|---|
| 6,290,738 B1 | 9/2001 | Holm |
| 6,293,268 B1 | 9/2001 | Mammarella |
| 6,354,283 B1 | 3/2002 | Hawkins et al. |
| 6,402,798 B1 | 6/2002 | Kallsen et al. |
| 6,418,918 B2 | 7/2002 | Mammarella |
| 6,478,018 B2 | 11/2002 | Fedorowicz et al. |
| 6,478,019 B2 | 11/2002 | Fedorowicz et al. |
| 6,505,615 B2 | 1/2003 | Pietschner |
| 6,533,712 B1 | 3/2003 | Miller et al. |
| 6,568,540 B1 | 5/2003 | Holzmann et al. |
| 6,576,045 B2 | 6/2003 | Liu et al. |
| 6,601,385 B2 | 8/2003 | Verdegan et al. |
| 6,626,163 B1 | 9/2003 | Busen et al. |
| 6,684,864 B1 | 2/2004 | Busen et al. |
| 6,797,040 B2 | 9/2004 | Lenzig |
| 6,973,925 B2 | 12/2005 | Sauter et al. |
| 7,080,636 B2 | 7/2006 | Knaus et al. |
| 7,152,589 B2 | 12/2006 | Ekeroth et al. |
| 7,156,901 B2 | 1/2007 | Hallgren et al. |
| 7,185,643 B2 | 3/2007 | Gronberg et al. |
| 7,238,216 B2 | 7/2007 | Malgorn et al. |
| 7,406,960 B2 * | 8/2008 | Knauf et al. ................ 123/572 |
| 2005/0000572 A1 | 1/2005 | Muller |
| 2006/0059875 A1 | 3/2006 | Malgorn et al. |
| 2006/0062699 A1 | 3/2006 | Evenstad et al. |
| 2006/0081229 A1 | 4/2006 | Gronberg et al. |
| 2006/0249128 A1 | 11/2006 | Shieh et al. |
| 2007/0062887 A1 | 3/2007 | Schwandt et al. |
| 2007/0256566 A1 | 11/2007 | Faber et al. |

FOREIGN PATENT DOCUMENTS

| | | |
|---|---|---|
| DE | 1544126 | 6/1969 |
| DE | 10051307 | 5/2002 |
| DE | 10320215 | 12/2004 |
| DE | 102005042286 | 4/2007 |
| EP | 0754840 | 1/1997 |
| EP | 1068890 | 1/2001 |
| EP | 1477641 | 11/2004 |
| FR | 1406047 | 7/1965 |
| FR | 2835764 | 8/2003 |
| FR | 2852056 | 9/2004 |
| WO | WO-2006/119737 | 11/2006 |
| WO | WO-2007/028351 | 3/2007 |
| WO | WO-2007/137934 | 12/2007 |
| WO | WO-2007/138008 | 12/2007 |

* cited by examiner

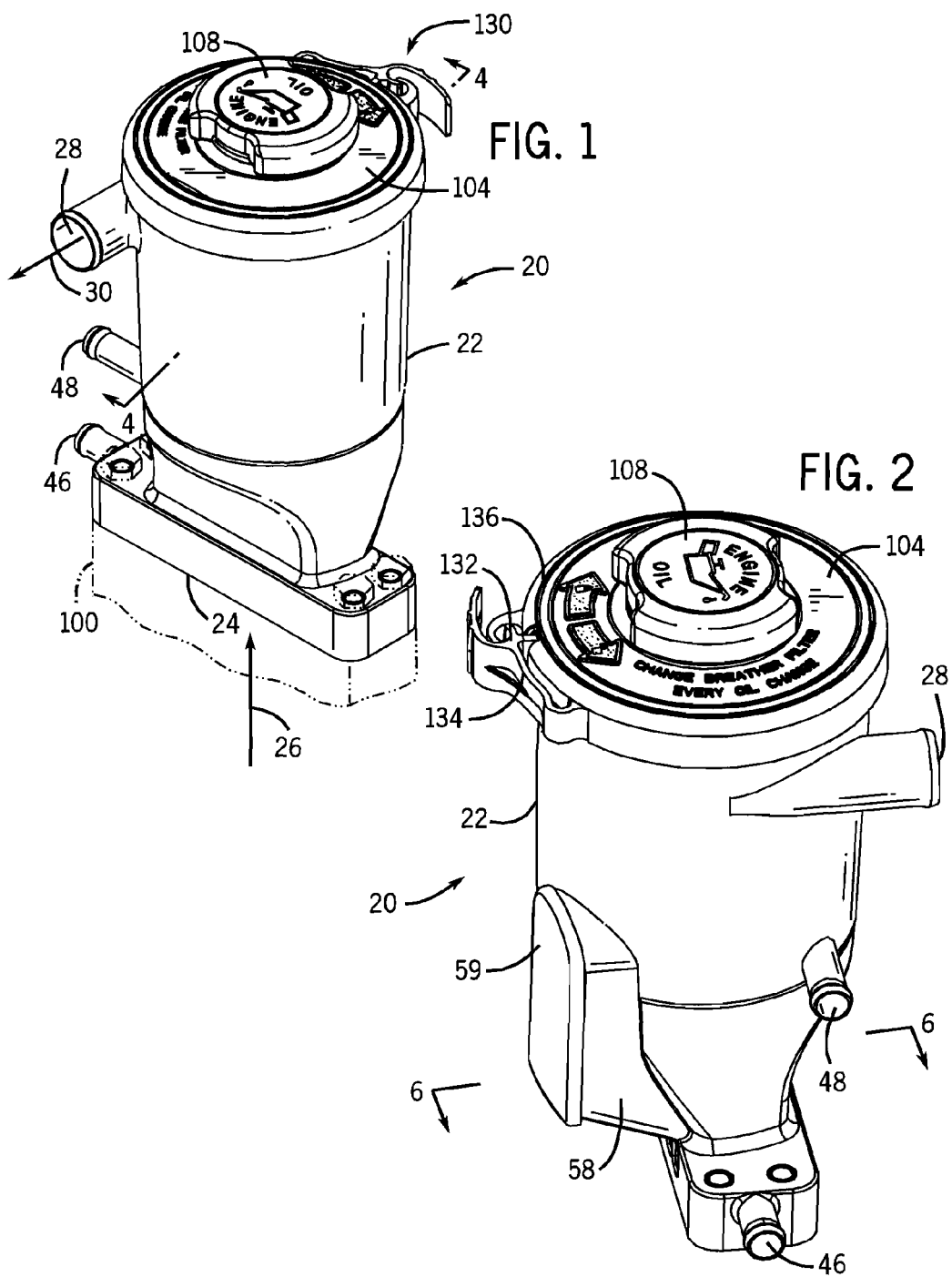

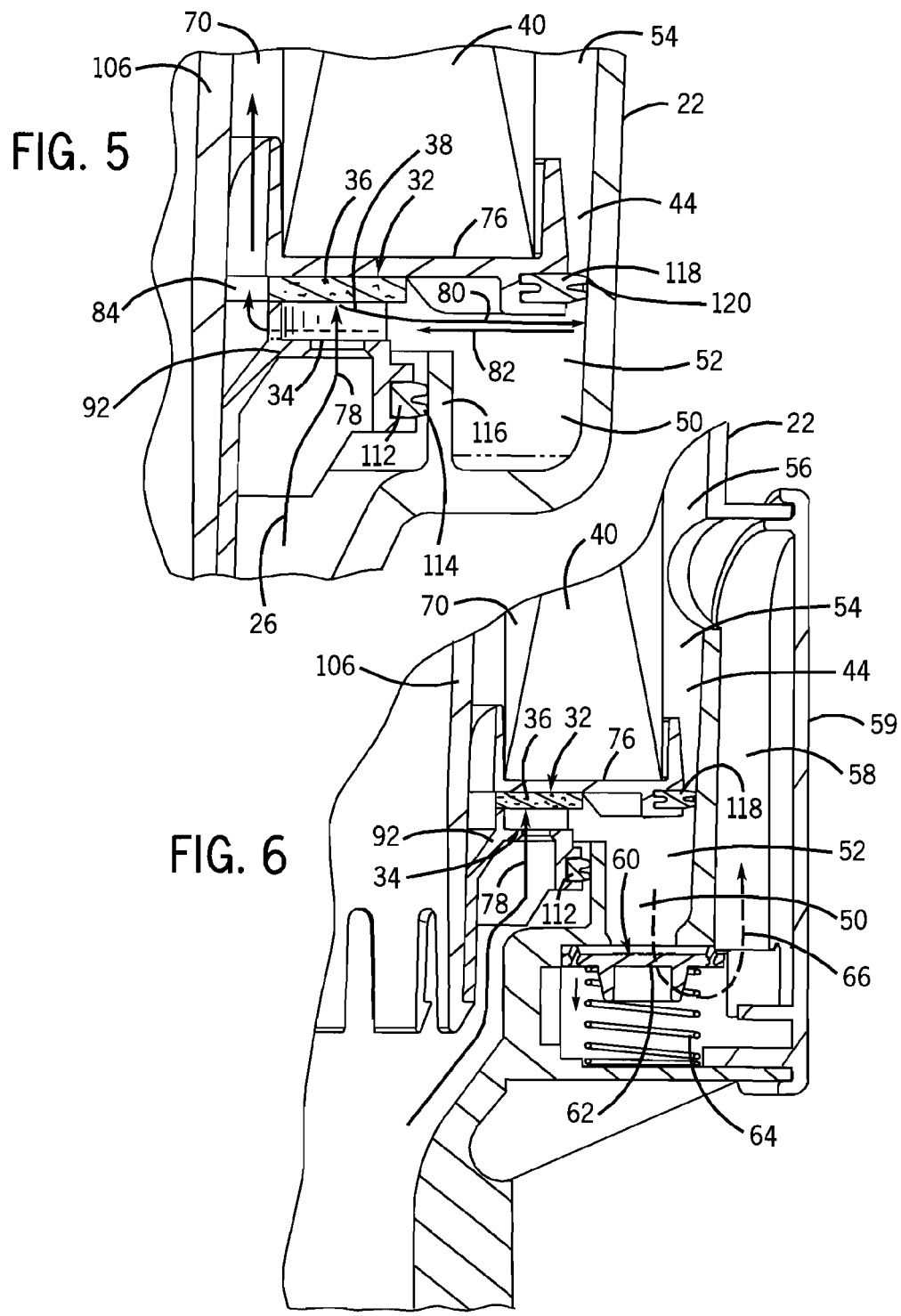

TWO STAGE DRAINAGE GAS-LIQUID SEPARATOR

BACKGROUND AND SUMMARY

The invention relates to gas-liquid separators, including for internal combustion engines including as an oil mist removal and breather element.

Various gas-liquid separators are known in the prior art. In one type, namely an inertial gas-liquid impactor separator, a gas-liquid stream is accelerated through one or more nozzles, and an inertial impactor is provided in the path of the accelerated gas-liquid stream causing a sharp directional change thereof which in turn causes liquid particle separation from the gas-liquid stream. In another type, a coalescer filter effects liquid particle separation, and coalesces separated liquid particles.

The present invention arose during continuing development efforts directed toward the above technologies and combinations thereof.

BRIEF DESCRIPTION OF THE DRAWINGS

FIG. 1 is a perspective view of a two stage drainage gas-liquid separator assembly in accordance with the invention.

FIG. 2 is a perspective view of the assembly of FIG. 1 from a different angle.

FIG. 5 is an enlarged view of a portion of FIG. 4.

FIG. 6 is an enlarged sectional view taken along line 6-6 of FIG. 2.

DETAILED DESCRIPTION

Figure 3:
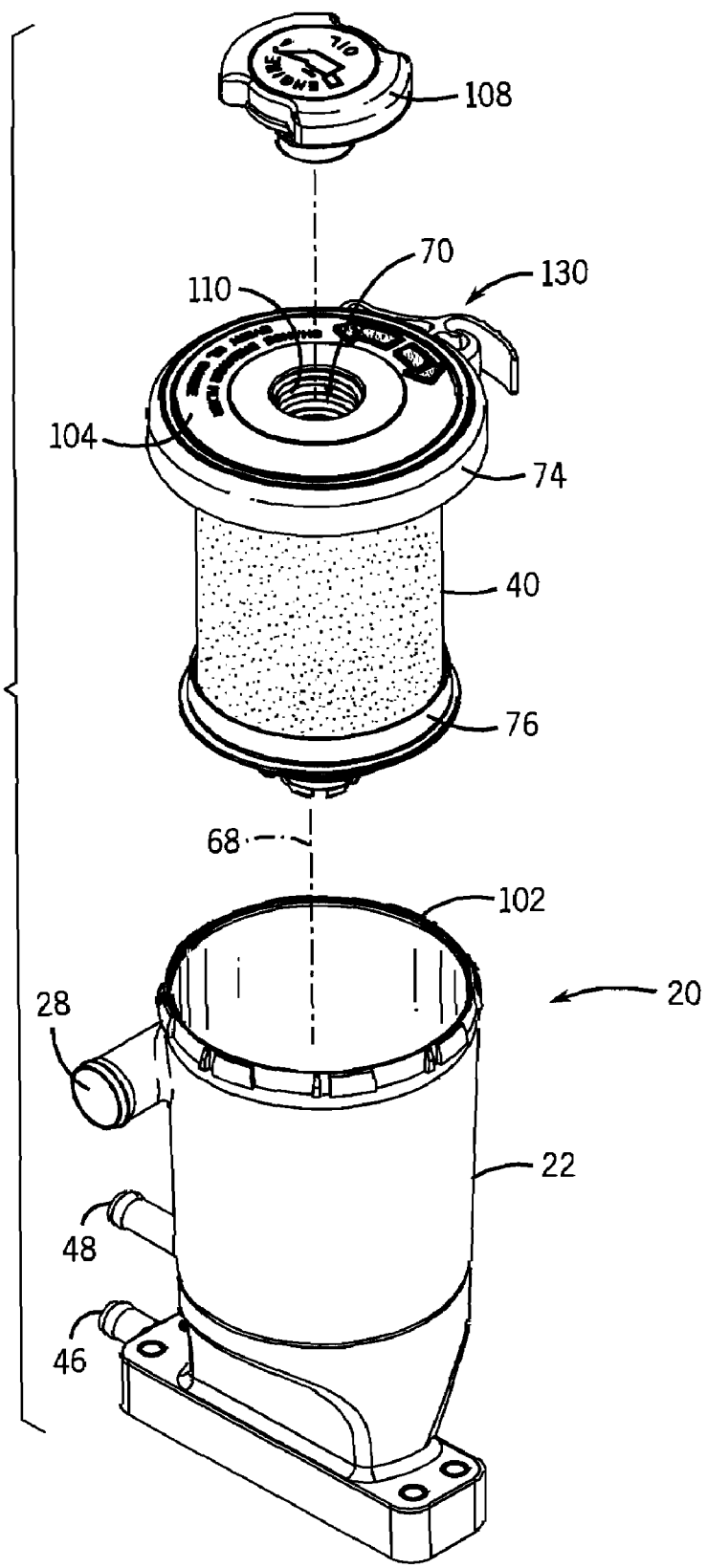
FIG. 3 is an exploded perspective view of the assembly of FIG. 1.
Figure 4:
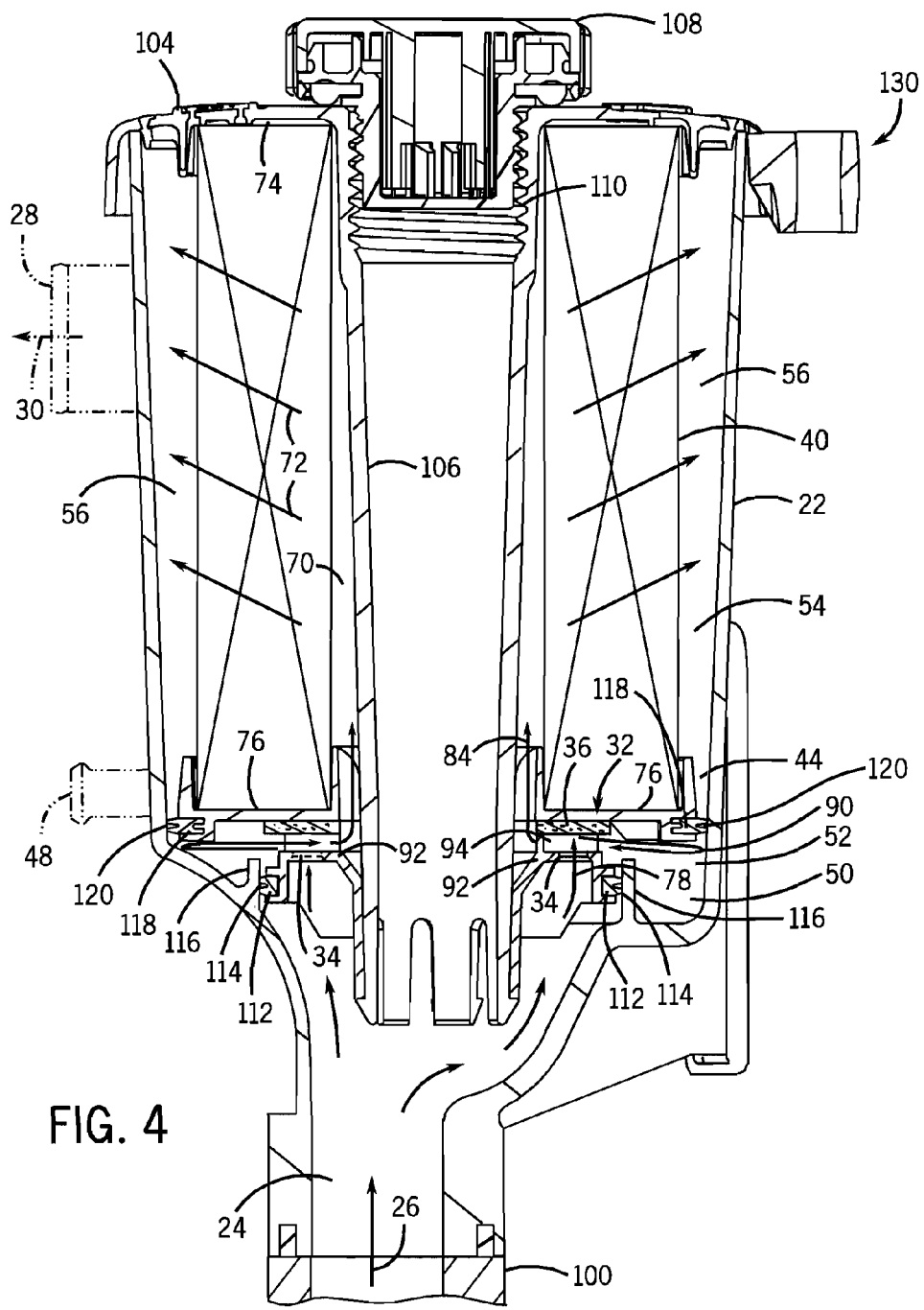
FIG. 4 is a sectional view taken along line 4-4 of FIG. 1.
Figure 7:
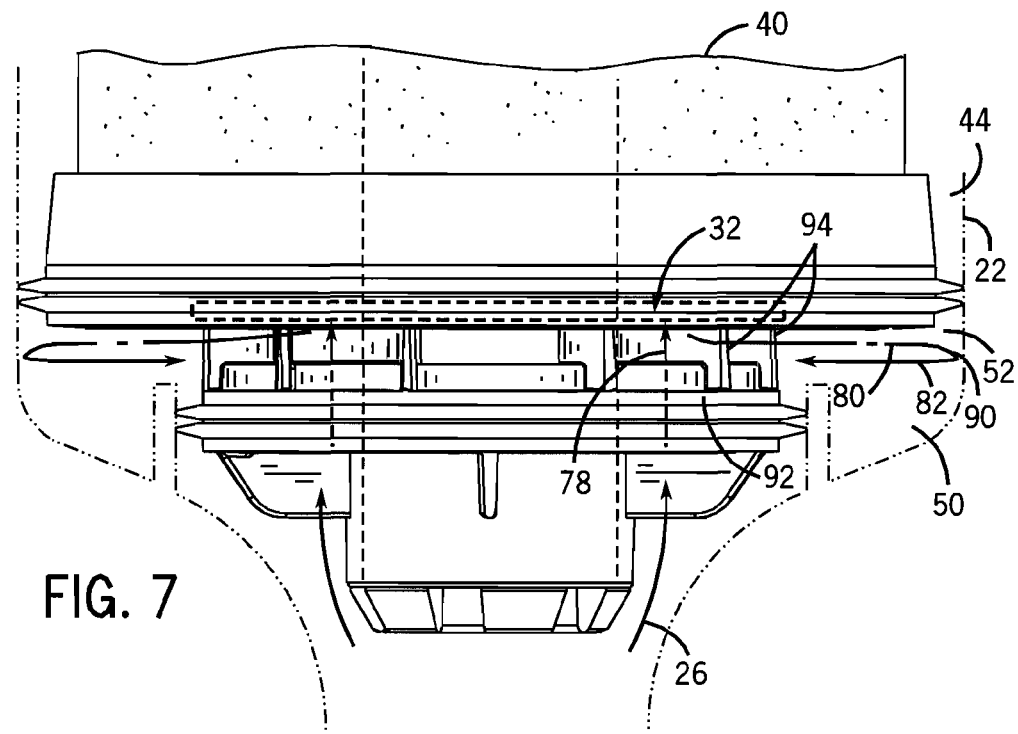
FIG. 7 is an enlarged elevation view of a portion of the structure of FIG. 4.

FIGS. 1-4 show a two stage drainage gas-liquid separator assembly 20 including a housing 22 having a flowpath from upstream to downstream from an inlet 24, FIG. 4, for receiving a gas-liquid stream 26, to an outlet 28 for discharging a gas stream 30. An inertial gas-liquid impactor separator 32, FIGS. 4-8, is provided in the housing and includes one or more nozzles 34 accelerating gas-liquid stream 26 therethrough, and an inertial impactor 36 in the path of the accelerated gas-liquid stream and causing a sharp directional change thereof as shown at 38, FIG. 5, which in turn causes liquid particle separation from the gas-liquid stream, as is known, for example as shown in U.S. Pat. No. 6,290,738, incorporated herein by reference. Also provided in the housing is a coalescer filter 40, FIGS. 3, 4, downstream of inertial gas-liquid impactor separator 32 and effecting further liquid particle separation, and coalescing separated liquid particles. In one embodiment, coalescer filter 40 is disposed above inertial impactor 36 and vertically aligned therewith, FIGS. 4-6.

Figure 10:
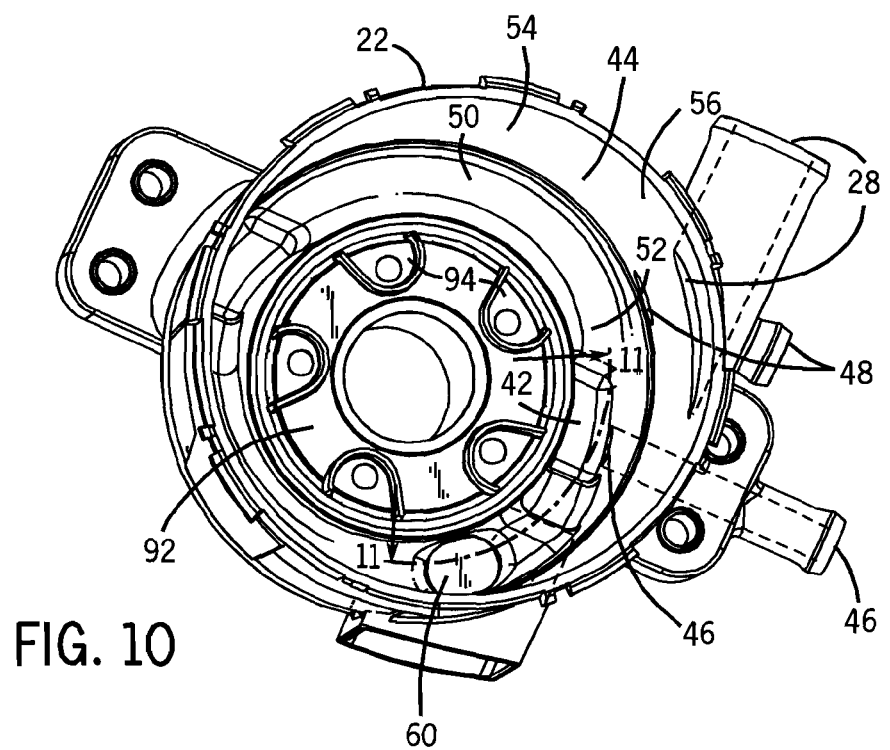
FIG. 10 is a perspective view from above of a component of FIG. 3.
Figure 11:
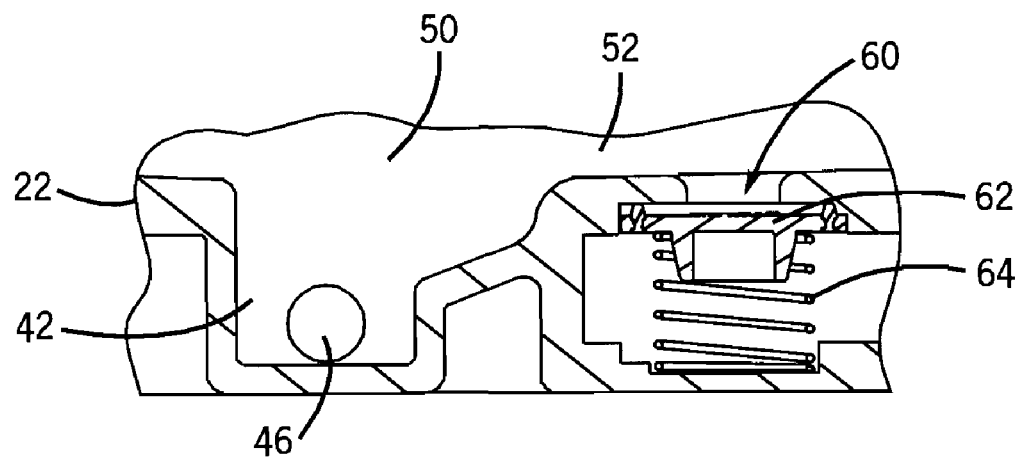
FIG. 11 is a sectional view taken along line 11-11 of FIG. 10.

Housing 22 has a first drainage collection chamber 42, FIGS. 10, 11, at inertial gas-liquid impactor separator 32 and collecting separated liquid therefrom. The housing has a second drainage collection chamber 44, FIGS. 4, 5, at coalescer filter 40 and collecting separated and coalesced liquid therefrom. Drainage collection chamber 44 is spaced above drainage collection chamber 42. The housing has first and second drain ports 46 and 48, FIGS. 1-3, 10, 11. Drain port 46 drains liquid from inertial gas-liquid impactor separator 32. Drain port 48 drains liquid from coalescer filter 40.

The housing has a first plenum 50, FIGS. 4-7, 10, 11 at inertial gas-liquid impactor separator 32. Plenum 50 has a lower portion 42 providing the noted first drainage collection chamber, and an upper portion 52 for receiving gas from inertial gas-liquid impactor separator 32. The housing has a second plenum 54 at coalescer filter 40. Plenum 54 has a lower portion 44 providing the noted second drainage collection chamber, and an upper portion 56 passing gas therethrough from coalescer filter 40 to outlet 28. The housing has an auxiliary bypass passage 58, FIGS. 2, 6, from upper portion 52 of lower plenum 50 to upper portion 56 of upper plenum 54 for passing gas from inertial gas-liquid impactor separator 32 through upper portion 52 of plenum 50 then through auxiliary bypass passage 58 then through upper portion 56 of plenum 54 to outlet 28. Auxiliary bypass passage 58 is closed along its outer housing surface by cover plate 59. A pressure responsive valve 60, FIGS. 6, 10, 11 is provided in the auxiliary bypass passage, which valve is open above a designated gas pressure in plenum 50 to pass gas from first plenum 50 to second plenum 54, and which valve is closed below a designated pressure to block passage of gas from plenum 50 to plenum 54. In one embodiment, the pressure responsive valve 60 is provided by a plunger 62 biased upwardly by spring 64 to a closed position. When gas pressure in plenum 50 rises above a given value, such pressure overcomes the bias of spring 64, and plunger 62 moves downwardly to open a gas path as shown at dashed line arrow 66 in FIG. 6, to permit gas to flow from plenum 50 through passage 58 to plenum 54. This is desired in the event of a plugged coalescer filter 40, and allows inertial gas-liquid impactor separator 32 to continue to operate.

Coalescer 40 is an annular member extending axially along an axis 68, FIG. 3, and having a hollow interior 70, FIGS. 3-6. In the preferred embodiment, the flow path 72 through annular coalescer filter 40 is inside-out, namely from hollow interior 70 then laterally outwardly through annular coalescer filter 40. Filter 40 has upper and lower end caps 74 and 76. Inertial impactor 36 is at lower end cap 76 and faces axially downwardly. The flow path extends axially upwardly through the one or more nozzles 34 as shown at arrow 78, FIGS. 4-8, and against inertial impactor 36 at lower end cap 76 of annular coalescer filter 40 and then extends laterally as shown at flow arrows 80, 82 and then axially upwardly as shown at flow arrow 84 into hollow interior 70 and then laterally outwardly as shown at flow arrows 72 through annular coalescer filter 40.

Figure 8:
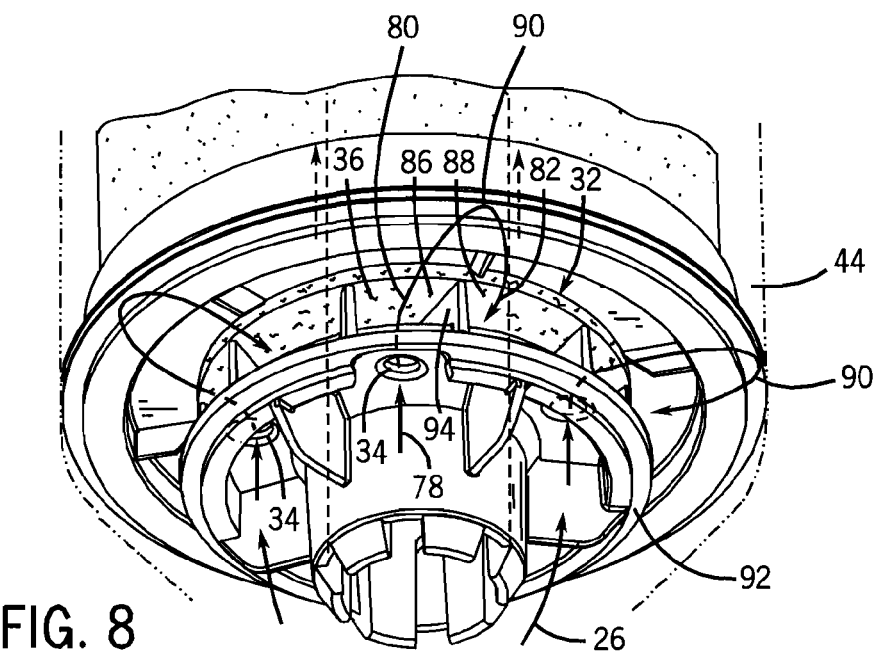
FIG. 8 is a perspective view from below of the structure of FIG. 7.
Figure 9:
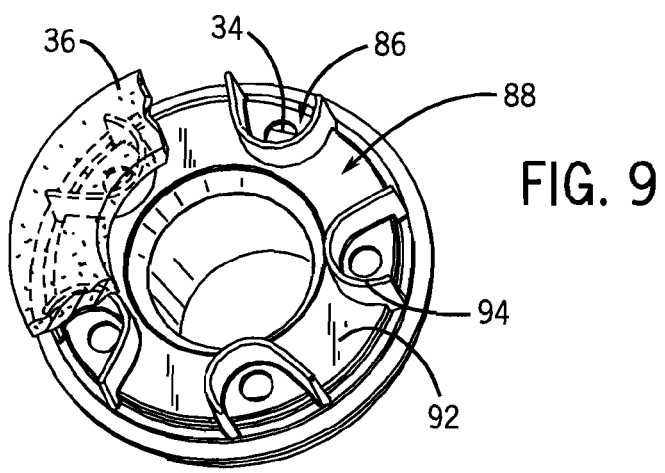
FIG. 9 is a perspective view from above of a component of FIG. 8.

A plurality of guide channels 86, 88, FIGS. 8-10, are provided adjacent lower end cap 76 and direct the flow path from inertial impactor 36 initially laterally outwardly as shown at flow arrow 80, FIGS. 8, 5, away from hollow interior 70, and then laterally inwardly as shown at flow arrow 82 toward hollow interior 70. A plurality of first guide channels 86 direct flow laterally outwardly at 80 in a first lateral direction (rightwardly in FIG. 5). A plurality of second guide channels 88 direct flow laterally inwardly in a second lateral direction (leftwardly in FIG. 5) opposite to the noted first lateral direction. The flow path turns at bend 90 upon striking the housing sidewall. Nozzles 34 are formed in a nozzle plate 92 axially spaced below lower end cap 76 of annular coalescer filter 40.

Guide channels 86, 88 are formed by a plurality of radial walls 94 extending axially upwardly from nozzle plate 92.

In one desirable implementation, separator assembly 10 is an oil mist removal and breather element for an internal combustion engine 100. Housing 22 is a cup-shaped member having an open top 102, FIG. 3, closed by a removable lid 104 such that annular coalescer filter 40 may be accessed and replaced upon removal of lid 104. In the preferred embodiment, upper end cap 74 is part of lid 104 such that removal of lid 104 removes annular coalescer filter 40 as a unitary subassembly therewith. Lid 104 has an oil fill tube 106, FIG. 4, extending axially downwardly therefrom into hollow interior 70 of annular coalescer filter 40 for adding oil to the engine. An oil fill cap 108 engages oil fill tube 106 in threaded relation at retention threads 110 along the inner surface of oil fill tube 106 and is removable therefrom to permit oil to be poured into oil fill tube 106. Oil fill tube 106, upper and lower end caps 74 and 76, and annular coalescer filter 40 are a unitary subassembly with lid 104, FIG. 3, and are removable as a unit from housing 22 through open top 102 upon removal of lid 104. The subassembly includes nozzle plate 92 axially spaced below lower end cap 76 of annular coalescer filter 40. Nozzles 34 are formed in nozzle plate 92, and are laterally outward of oil fill tube 106. Nozzle plate 92 has a first gasket 112 laterally outward of nozzles 34 and engaging the housing at a first sealing location 114 at annular housing shoulder 116. Lower end cap 76 has a second gasket 118 laterally outward of and above gasket 112 and engaging the housing at a second sealing location 120. Gaskets or seals 112, 118 may be provided as disclosed in U.S. Pat. No. 6,568,540, incorporated herein by reference. Second gasket 118 has a greater diameter than first gasket 112. Upper portion 52 of lower plenum 50 is between first and second sealing locations 114 and 120 at first and second gaskets 112 and 118, respectively. Drainage collection chamber 44 is above sealing location 120 at gasket 118. The flow path extending axially upwardly at 84 into hollow interior 70 is between oil fill tube 106 and annular coalescer filter 40.

Lid 104 is preferably mounted to cup-shaped housing member 22 by twist and lock structure providing an axial retention force holding the cup-shaped member and the lid in axial assembled condition upon axial movement of the cup-shaped member and the lid towards each other followed by rotation in a first rotational direction about axis 68, as in U.S. Pat. No. 6,402,798, incorporated herein by reference. As in the '798 patent, twist and lock structure 130 has a first position (FIG. 5 in the '798 patent) permitting axial movement (66 in the '798 patent) of cup-shaped member 22 and lid 104 relative to each other, and the twist and lock structure is rotatable in a first rotational direction (44 in the '798 patent) from the first position to a second position (FIG. 4 of the '798 patent), with the twist and lock structure in the second position preventing axial movement of the cup-shaped member and the lid relative to each other, and the twist and lock structure being rotatable in a second rotational direction (64 in the '798 patent) from the second position to the first position, the second rotational direction being opposite to the first rotational direction. Anti-rotation lock structure 132 includes an arm 134 (like arm 112 in the '798 patent) mounted to the lid, the arm having a hook portion 136 (like hook portion 120 in the '798 patent) engageable with the cup-shaped member and applying a retention force stopping rotation of the twist and lock structure from the second position to the first position, the hook portion being releasable from engagement with the cup-shaped member upon applying a release force to the arm (as shown at 124 in FIG. 10 of the '798 patent).

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A two stage drainage gas-liquid separator assembly comprising:

a housing having a flowpath therethrough from upstream to downstream, said housing having an inlet for receiving a gas-liquid stream, and an outlet for discharging a gas stream;

an inertial gas-liquid impactor separator in said housing comprising one or more nozzles accelerating said gas-liquid stream therethrough, and an inertial impactor in the path of said accelerated gas-liquid stream and causing liquid particle separation from said gas-liquid stream;

a coalescer filter in said housing downstream of said inertial gas-liquid impactor separator and effecting further liquid particle separation, and coalescing separated liquid particles;

first and second drain ports in said housing, said first drain port draining liquid from said inertial gas-liquid impactor separator, said second drain port draining liquid from said coalescer filter;

wherein said housing comprises:

a first plenum at said inertial gas-liquid impactor separator, said first plenum having a lower portion providing a first drainage collection chamber, and an upper portion for receiving gas from said inertial gas-liquid impactor separator;

a second plenum at said coalescer filter, said second plenum having a lower portion providing a second drainage collection chamber, and an upper portion passing gas therethrough from said coalescer filter to said outlet;

an auxiliary bypass passage from said upper portion of said first plenum to said upper portion of said second plenum for passing gas from said inertial gas-liquid impactor separator through said upper portion of said first plenum then through said auxiliary bypass passage then through said upper portion of said second plenum to said outlet.

2. The gas-liquid separator assembly according to claim 1 comprising a pressure responsive valve in said auxiliary bypass passage which is open above a designated gas pressure in said first plenum to pass gas from said first plenum to said second plenum, and which is closed below said designated pressure to block passage of gas from said first plenum to said second plenum.

3. A two stage drainage gas-liquid separator assembly comprising:

a housing having a flowpath therethrough from upstream to downstream, said housing having an inlet for receiving a gas-liquid stream, and an outlet for discharging a gas stream;

an inertial gas-liquid impactor separator in said housing comprising one or more nozzles accelerating said gas-liquid stream therethrough, and an inertial impactor in the path of said accelerated gas-liquid stream and causing liquid particle separation from said gas-liquid stream;

a coalescer filter in said housing downstream of said inertial gas-liquid impactor separator and effecting further liquid particle separation, and coalescing separated liquid particles, wherein:

said coalescer filter is an annular member extending axially along an axis and having a hollow interior;

said flowpath through said annular coalescer filter is inside-out, namely from said hollow interior then laterally outwardly through said annular coalescer filter;

said annular coalescer filter has upper and lower end caps, and said inertial impactor is at said lower end cap and faces axially downwardly.

4. The gas-liquid separator assembly according to claim 3 wherein said flowpath extends axially upwardly through said one or more nozzles and against said inertial impactor at said lower end cap of said annular coalescer filter and then extends laterally along said lower end cap and then axially upwardly into said hollow interior and then laterally outwardly through said annular coalescer filter.

5. The gas-liquid separator assembly according to claim 4 comprising a plurality of guide channels adjacent said lower end cap and directing said flowpath from said inertial impactor initially laterally outwardly away from said hollow interior and then laterally inwardly toward said hollow interior.

6. The gas-liquid separator assembly according to claim 5 comprising at least a first said guide channel directing flow laterally outwardly in a first lateral direction, and at least a second said guide channel adjacent said first guide channel and directing flow laterally inwardly in a second lateral direction opposite to said first lateral direction.

7. The gas-liquid separator assembly according to claim 5 wherein said one or more nozzles are formed in a nozzle plate axially spaced below said lower end cap of said annular coalescer filter, and said guide channels comprise a plurality of radial walls extending axially upwardly from said nozzle plate.

8. A two stage drainage gas-liquid separator assembly comprising:

a housing having a flowpath therethrough from upstream to downstream, said housing having an inlet for receiving a gas-liquid stream, and an outlet for discharging a gas stream;

an inertial gas-liquid impactor separator in said housing comprising one or more nozzles accelerating said gas-liquid stream therethrough, and an inertial impactor in the path of said accelerated gas-liquid stream and causing liquid particle separation from said gas-liquid stream;

a coalescer filter in said housing downstream of said inertial gas-liquid impactor separator and effecting further liquid particle separation, and coalescing separated liquid particles, wherein:

said coalescer filter is an annular member extending axially along an axis and having a hollow interior;

said separator assembly is an oil mist removal and breather element for an internal combustion engine, and said housing is a cup-shaped member having an open top closed by a removable lid such that said annular coalescer filter may be accessed and replaced upon removal of said lid;

said lid has an oil fill tube extending axially downwardly therefrom into said hollow interior of said annular coalescer filter for adding oil to said engine;

said annular coalescer filter has upper and lower end caps; said inertial impactor is at said lower end cap and faces axially downwardly;

said oil fill tube, said upper and lower end caps, and said annular coalescer filter comprise a unitary subassembly with said lid and are removable as a unit from said housing through said open top upon removal of said lid.

9. The gas-liquid separator assembly according to claim 8 wherein:

said subassembly includes a nozzle plate axially spaced below said lower end cap of said annular coalescer filter;

said one or more nozzles are formed in said nozzle plate, and are laterally outward of said oil fill tube;

said nozzle plate has a first gasket laterally outward of said one or more nozzles and engaging said housing at a first sealing location;

said lower end cap has a second gasket laterally outward of and above said first gasket and engaging said housing at a second sealing location;

said second gasket has a greater diameter than said first gasket.

10. The gas-liquid separator assembly according to claim 9 wherein:

said housing has a first plenum at said inertial gas-liquid impactor separator, said first plenum having a lower portion providing a first drainage collection chamber for receiving liquid from said inertial gas-liquid impactor separator, and an upper portion for receiving gas from said inertial gas-liquid impactor separator;

said housing has a second plenum at said coalescer filter, said second plenum having a lower portion providing a second drainage collection chamber receiving liquid from said coalescer filter, and an upper portion for receiving gas from said coalescer filter;

said upper portion of said first plenum is between said first and second sealing locations at said first and second gaskets, respectively.

11. The gas-liquid separator assembly according to claim 10 wherein said second drainage collection chamber is above said second sealing location at said second gasket.

12. A two stage drainage gas-liquid separator assembly comprising:

a housing having a flowpath therethrough from upstream to downstream, said housing having an inlet for receiving a gas-liquid stream, and an outlet for discharging a gas stream;

an inertial gas-liquid impactor separator in said housing comprising one or more nozzles accelerating said gas-liquid stream therethrough, and an inertial impactor in the path of said accelerated gas-liquid stream and causing liquid particle separation from said gas-liquid stream;

a coalescer filter in said housing downstream of said inertial gas-liquid impactor separator and effecting further liquid particle separation, and coalescing separated liquid particles, wherein:

said coalescer filter is an annular member extending axially along an axis and having a hollow interior;

said separator assembly is an oil mist removal and breather element for an internal combustion engine, and said housing is a cup-shaped member having an open top closed by a removable lid such that said annular coalescer filter may be accessed and replaced upon removal of said lid;

said lid has an oil fill tube extending axially downwardly therefrom into said hollow interior of said annular coalescer filter for adding oil to said engine;

said flowpath through said annular coalescer filter is inside-out, namely from said hollow interior then laterally outwardly through said annular coalescer filter, and wherein said annular coalescer filter has upper and lower end caps, and said inertial impactor is at said lower end cap and faces axially downwardly, and said flowpath extends axially upwardly through said one or more nozzles and against said inertial impactor at said lower end cap of said annular coalescer filter then laterally along said lower end cap then axially upwardly into said hollow interior between said oil fill tube and said annular coalescer filter and then laterally outwardly through said annular coalescer filter.

13. The gas-liquid separator assembly according to claim 12 comprising a first set of guide channels at said inertial impactor and directing said flow path initially laterally outwardly in a first lateral direction, and a second set of guide channels directing said flowpath laterally inwardly along said lower end cap along a second lateral direction against said oil fill tube whereafter said flowpath extends axially upwardly in said hollow interior between said oil fill tube and said annular coalescer filter, said second lateral direction being opposite to said first lateral direction.

* * * * *